United States Patent [19]

Engelbrecht

[11] 3,872,480

[45] Mar. 18, 1975

[54] METHOD OF ELECTROSTATIC RECORDING ON ELECTRICALLY INSULATING FILMS BY NON-WETTING ELECTRICALLY CONDUCTIVE LIQUIDS

[75] Inventor: Rudolf Succo Engelbrecht, Langnau A.A., Switzerland

[73] Assignee: RCA Corporation, New York, N.Y.

[22] Filed: Mar. 14, 1974

[21] Appl. No.: 451,093

[52] U.S. Cl. .................... 346/74 ES, 101/DIG. 13
[51] Int. Cl. ............................................ G03g 13/10
[58] Field of Search ......... 346/74 ES, 74 EX, 74 S, 346/74 SB, 74 EK; 178/6.6 A; 204/2; 324/32; 101/DIG. 13; 118/DIG. 23; 117/93.4, 143, 37 LE

[56] References Cited
UNITED STATES PATENTS 3,375,528  3/1968  Klausons ........................ 178/6.6 A
3,489,850  1/1970  Adams ............................ 178/6.6 A
3,810,193  5/1974  Metcalfe ........................ 346/74 ES Primary Examiner—Bernard Konick
Assistant Examiner—Jay P. Lucas
Attorney, Agent, or Firm—H. Christoffersen; A. I. Spechler

[57] ABSTRACT

Electrostatic charges are applied to an electrically insulating film with the aid of a pointed or patterned probe wetted with an electrically conductive liquid. The liquid is non-wetting on the film. A source of voltage (20–100V ac or dc) is applied between the probe and one major surface of the film; and relative motion is applied between the probe and the other major surface of the film so that the liquid comes into only non-wetting contact with selected areas of the film. The liquid adheres only to the probe and moves therewith.

13 Claims, 12 Drawing Figures 3,872,480
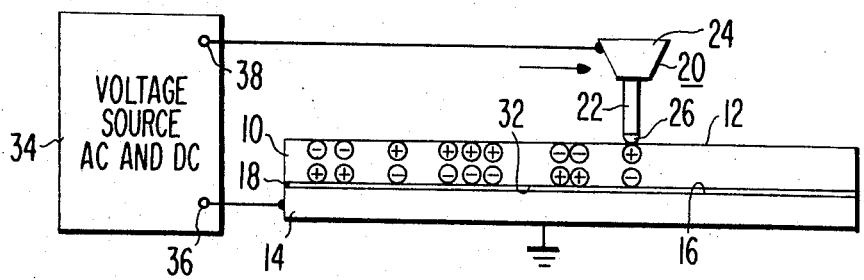 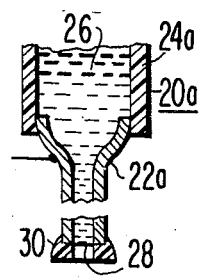
Fig.1  Fig.1a
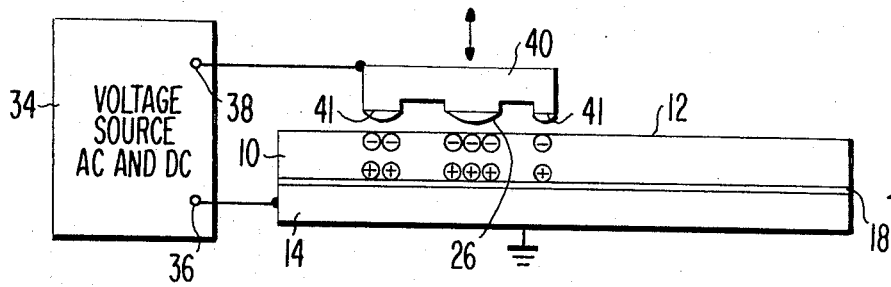
Fig.2
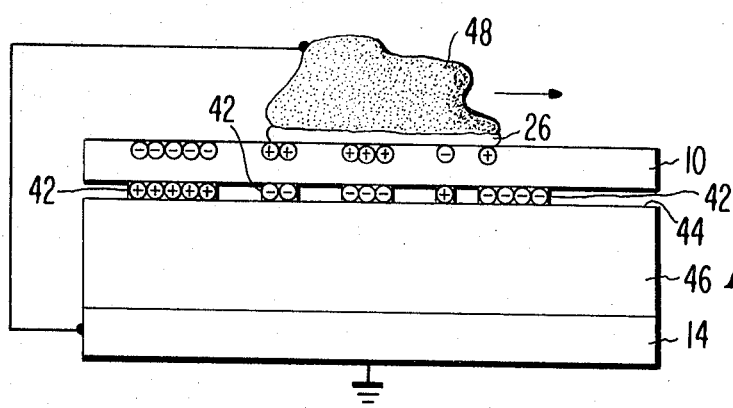
Fig.3
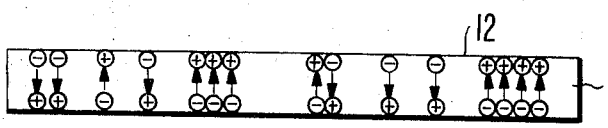
Fig.4
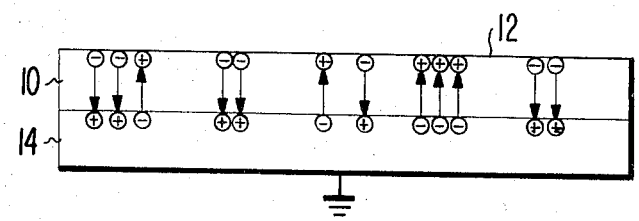
Fig.5
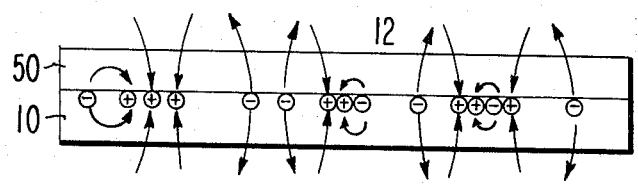
Fig.6

METHOD OF ELECTROSTATIC RECORDING ON ELECTRICALLY INSULATING FILMS BY NON-WETTING ELECTRICALLY CONDUCTIVE LIQUIDS

This invention relates to a method of electrostatic recording, and more particularly to method of electrostatic recording on electrically insulating films by non-wetting conductive liquids. The novel method provides means for recording, storing, and erasing electrostatic charges on insulating surfaces compactly, efficiently, and economically in comparison with many prior art methods of electrostatic recording.

Prior-art methods of charging insulators electrostatically use primarily either corona discharge methods or electron (ion) beam methods. These charging methods have the disadvantages of requiring a high-voltage operation and a need for a vacuum or a controlled gaseous environment.

The uniform charging (and discharging) of large insulator surfaces has been accomplished by employing conductive, wetting liquids under the application of an electric field. In these prior-art methods, however, the voltage-biased bulk liquid was first applied to the insulator and then removed, leaving a thin conductive layer of liquid on the insulator. The electrostatic charge transfer occurred after the remaining liquid layer on the surface of the insulator evaporated. Also, in prior-art methods where bulk liquids were used, voltages in excess of 100 volts were necessary to accomplish the charging process.

Briefly stated, the novel method of electrostatic recording or an electrically insulating film by a non-wetting electrically conductive liquid comprises, in one embodiment, the steps of (a) wetting a probe with the electrically conductive liquid that is non-wetting on the film, (b) applying a source of voltage between one major surface of the film and the probe, and (c) applying relative motion between the probe and the other major surface of the film so that the liquid comes into only non-wetting contact with selected areas of the opposite major surface of the film, the liquid adhering only to the probe and moving therewith. The voltage source between the probe and the film may be in the neighborhood of between about 20 and 100 volts ac or dc.

In another embodiment of the novel method, the probe comprises a wettable material having a patterned surface that is brought into momentary non-wetting contact with the film.

In still another embodiment of the novel method, the voltage source between the probe and the film is a variable voltage so that the probe can be programmed to "write" a continuous-tone charge pattern, for example, a raster as used in facsimile or television image displays.

Different embodiments of the novel method will be described in conjunction with the following drawings wherein:

FIG. 1 is a schematic drawings of apparatus useful in carrying out the novel method of electrostatic recording;

FIG. 1a is a fragmentary cross-sectional drawing of a probe that can be substituted for the probe illustrated in FIG. 1;

FIG. 2 is a shematic drawing of appparatus for electrostatic recording with the aid of a probe having a patterned surface, in accordance with the novel method;

FIG. 3 is a schematic drawing of apparatus for recording a preselected charge pattern, in accordance with the novel method;

FIGS. 4, 5 and 6 are schematic drawings of the electrostatic charge distribution in insulating films prior to their storage in accordance with the novel method;

Similar parts in each of the FIGS. 1–11 will be designated by similar reference numerals.

Figure 7:
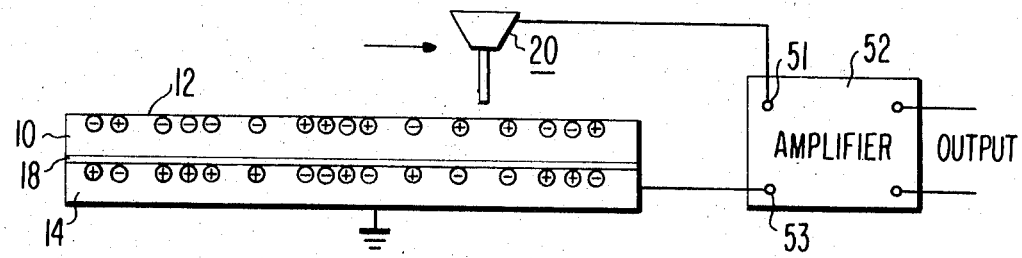
FIG. 7 is a schematic drawing of apparatus for the non-destructive read-out of charge patterns on an insulating surface, in accordance with the novel method.
Figure 8:
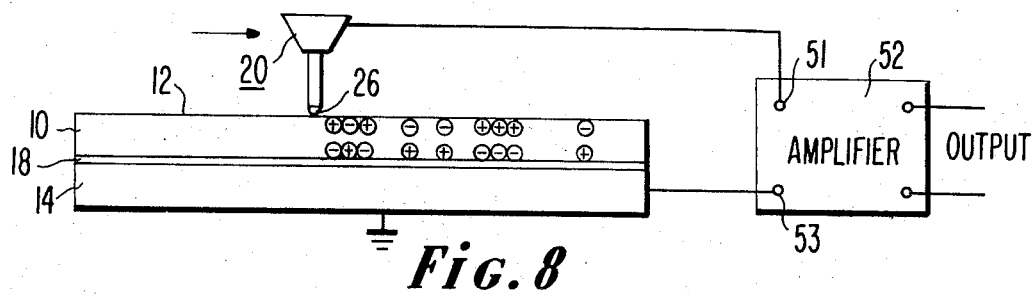
FIG. 8 is a schematic drawing of apparatus for the destructive read-out of electrostatic charge patterns on an insulating surface, in accordance with the novel method.

Referring now to FIG. 1 of the drawing, there is shown an electrically insulating film 10 on whose upper surface 12 it is desired to record an electrostatic charge pattern. The insulating film 10 may comprise a sheet of plastic material, such as of acrylic material, polystrene material, polytetrafluoroethylene material, or polyethylene-terephthalate material, having a thickness of between about 10 and 50 $\mu$m, for example. The insulating film 10 is placed in electrical contact with an electrically conductive plate 14, for example, as by disposing the insulating film 10 on an upper wetted surface 16 of the plate 14. Thus, a thin layer 18 of a conductive liquid, such as water, ethanol, or methanol, for example, is disposed between the insulating film 10 and the conductive plate 14. The conductive layer 18 may also comprise a sheet of paper or a blotter wetted with the conductive liquid.

A probe 20 is disposed above the upper surface 12 of the insulating film 10 and adapted to move over the surface 12 in a predetermined path (as indicated by the associated arrow, for example,) by any suitable means known in the art. The probe 20 comprises a relatively pointed wettable member 22, such as an ink recorder pen tip of fiber or felt, for example, depending from a reservoir container 24 for holding a conductive liquid 26. The conductive liquid 26 can be the same as that used in the layer 18. However, the liquid 26 and the pointed member 22 are disposed to provide a non-wetting contact with the surface 12 of the insulating film 10.

A probe 20a, shown in FIG. 1a, can be substituted for the probe 20 in FIG. 1 for recording linear charge patterns on the film 10. The probe 20a comprises a needle 22a, like a hypodermic needle, depending from a reservoir container 24a for the conductive liquid 26. The relatively pointed tip 28 of the probe 20a is separated from the surface 12 by a tubular member 30 of an electrically insulating material. The member 30 has an opening that communicates with the opening in the needle 22a so that only the conductive liquid 26 can contact the upper surface 12 of the insulating film 10. The internal diameter of the needle 22a, at its tip 28, is between about 0.1 mm and 1.0 mm.

In operation, the probe 20 (or 20a) is adapted to be moved over the surface 12 of the insulating layer 10 so that the liquid 26 moves with the wetted probe and comes into only a non-wetting contact with the surface 12.

Means are provided to voltage-bias the conductive liquid 26 with respect to the conductive plate 14, that is, with respect to the lower surface 32 of the insulating film 10 also. To this end, a source 34 of both ac and dc voltage, in the range of between about 20 volts and 100 volts, has one output terminal 36 connected to the conductive plate 14 and another output terminal 38 connected to the probe 20 (20a), that is, in electrical contact with the conductive liquid 26, as shown in FIGS. 1 and 1a. Charge patterns of either polarity (illustrate by + or − symbols in a circle) may be deposited on the surface 12 of the film 10, depending on the polarity of the signals applied to the probe 20 (or 20a).

Continuous or intermittent charge lines (charge patterns) can be drawn manually with either of the probes 20 and 20a. With a dc voltage applied, hand written or graphic information in the form of charge patterns can be recorded. With an alternating voltage, the probes 20 or 20a can be programmed to "write" a continuous tone pattern, for example, a raster such as used in facsimile or television image displays. For applied voltages from about 20 to 100V of either polarity, complete charge transfer to the insulating film 10 occurs for any probe speeds by means known in the art.

With the conductive liquid layer 18, between the film 10 and the plate 14, dipole charges are formed across the insulating film 10 during recording, as shown in FIG. 1. Without the liquid layer 18, only monopole charges are deposited on the top surface 12 of the film 10. The resolution of the deposited charge patterns is determined by the size of the tips of the probes 20 and 20a.

By means of patterned, conductive-liquid, non wetting contacts, as with a patterned probe 40, shown in FIG. 2, pre-established characters of designs can be recorded in charge patterns on the surface 12 of the film 10. The patterned probe 40 may of felt, for example, having a flat, patterned, contact surface 41. By a momentary non-wetting contact of the voltage-biased (20–100V) patterned probe, either fixed geometrical shapes (e.g., typewriter characters) or selectively energized designs (e.g., 7-bar alphanumerics) can be recorded on the surface 12. Either dipole or monopole charge patterns can be generated with the voltage-biased patterned probe 40, depending upon whether the layer 18 is present or absent, respectively, as explained for the operation of the method with the apparatus in FIG. 1.

Recordings of preselected electrostatic charge patterns can also be achieved by placing a programmable electrical conductor array between the insulating film 10 and the conductive plate 14, as shown in FIG. 3. Referring now to FIG. 3, there are shown charge patterns on conductors 42 on the surface 44 of an insulating substrate 46. The insulating substrate 46 is disposed between the conductive plate 14 and the insulating film 10. A large probe 48, such as a sponge moistened with the conductive liquid 26, is disposed to move over the upper surface 12 of the insulating film 10 (in the direction indicated by the associated arrow) while it is connected to the (ground) plate 14. The probe 48 makes a non-wetting contact with the surface 12. Under these conditions, a copy of the charge pattern 42, in reverse polarity, is produced on the surface of the film 10. In this manner, 7-bar or 5×7 alphanumerics and artistic designs can be produced.

When electrostatic charge patterns are recorded as dipoles across the insulating film 10, as shown in FIG. 4, electric field lines are restricted mostly to the interior of the film 10. Thus, the attraction of external charges from the ambient is greatly diminished. The electrostatic charge patterns in the form of dipoles can be stored in excess of 1,000 hours on the film 10 without any marked dissipation.

Monopole charge layers can be stored with a ground electrode remaining attached to the insulating film 10, as when the (ground) plate 14 is in the form of metalization on the lower surface 32 of the film 10 as shown in FIG. 5. Under these conditions, the electric fields extend only to small distances above the top surface 12 of the film 10, thus minimizing a neutralization or discharging by external charge sources.

Monopole charge patterns on the film 10 without a metal backing can be stored by protecting the surface 12 of the insulating film 10 with an additional insulating film 50, as shown in FIG. 6. Under these conditions, the external electric fields are strong. Electrostatic charges attracted from the ambient to the free surface 12, however, can be removed by removing the insulating film 50 before read-out of the stored charged pattern.

Referring now to FIG. 7, means are shown for reading out an electrostatic charge pattern stored on the surface 12 of the insulating film 10. The probe 20 is connected to one input terminal 51 of an amplifier 52, and the conductive plate 14 is connected by another input terminal 53 of the amplifier 52. The probe 20 is adapted to be moved over the surface 12 at a uniform distance from it by any suitable means known in the art. A non-destructive read-out of the stored charged pattern on the surface 12 of the film 10 is obtained by moving the probe 20 across the surface 12 of the film 10. The charges induced in the probe 20 are amplified by the amplifier 52 and can subsequently be transmitted over conventional communications media as video signals, for example. The resolution of the patterns is determined by the size of the probe tip and the spacing of the probe from the surface 12. By using a capacitive, non-contacting probe, the charge patterns on the surface 12 of the film 10 are preserved for additional subsequent read-outs.

A destructive read-out of the charge patterns on the surface 12 of the insulator film 10 is achieved with a conductive wetted probe, such as the probe 20. The probe 20 is connected to the input terminal 51 of the amplifier 52 and the conductive plate 14 is connected to the input terminal 53. The wetted probe 20 is adapted to move over the surface 12 of the insulating film 10 in programmed scanning directions. Charges removed from the surface 12 through the non-wetting liquid 26 result in probe currents which are amplified by the amplifier 52 for further utilization. The resolution of the signals provided by the charge patterns is determined, in part, by the size of the tip of the probe 20.

Figure 9:
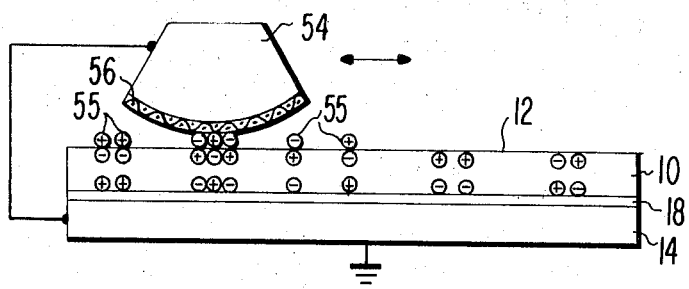
FIG. 9 is a schematic drawing of apparatus for toning electrostatic charge patterns made in accordance with the novel method.

A non-destructive graphic display of the charge patterns on a surface 12 of the insulating film 10 is obtained with toner particles 55 (e.g., graphite powdered toner) applied to the surface 12, as shown in FIG. 9. An electrically conductive toner dispenser 54 is electrically connected to the conductive (ground) plate 14, and the toner particles 55 are allowed to fall through a screen 56 as the container 54 is moved across the surface 12 of the film 10. About 10 percent of the electrostatic charge is transferred between the insulating film 10 and the toner particles 55 in the toning operation. Thus, the toner particles 55 may be transferred to a transfer sheet (not shown) in a manner well-known in the electrostatic printing art, to make one or several visible copies of the same charge pattern.

Figure 10:
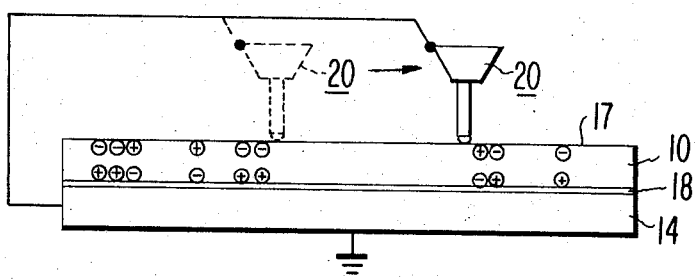
FIGS. 10 and 11 are schematic drawings for either selectively or broadly erasing electrostatic charge patterns, respectively, in accordance with the novel method.

Referring now to FIG. 10, there is shown apparatus by means of which selected portions of stored electrostatic charge patterns can be erased. In FIG. 10, the wetted probe 20 is electrically connected to the conductive (ground) plate 14 and is adapted to make a non-wetting contact with the surface 12 of the film 10. By moving the probe 20 over the selected portions of a previously deposited electrostatic charge pattern, the selected portions are erased.

Figure 11:
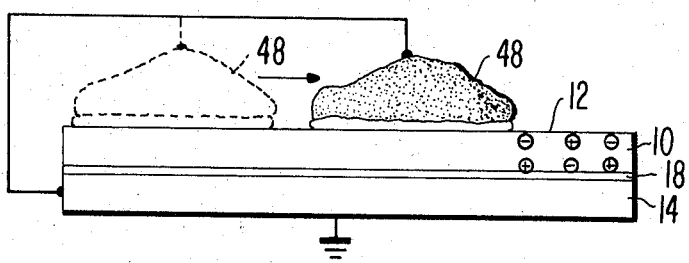

Entire electrostatic charge patterns on the upper surface 12 of the film 10 can be erased by applying thereto broad-area, conductive-liquid contacts electrically connected to the ground plate 14. For example, referring to FIG. 11, there is shown the wetted probe 48 disposed to be moved over the surface 12 of the film 10 so as to make a non-wetting contact with the surface 12. Under these conditions, the charge patterns on the surface 12 are erased.

While the detailed theory of liquid-insulator charge transfer is not fully understood, a highly efficient charging and discharging of insulating surfaces has been accomplished with moving conductive-liquid contacts without surface wetting. Because of its low recording voltage (20–100V), good resolution ( <50 $\mu$m), high charging rate (up to $10^{116\ 4}$ A/cm$^2$) and long storage (>1,000 hours) properties, the method is of general interest for a wide range of electrostatic image recording and display applications.

What is claimed is:

1. A method of electrostatic recording on an electrically insulating film comprising the steps of:
   wetting a probe with an electrically conductive liquid that is non-wetting on said film,
   applying a source of voltage between one major surface of said film and said probe, and
   applying relative motion between said probe and the other major surface of said film so that said liquid comes into only non-wetting contact with selected areas of said opposite major surface, said liquid adhering only to said probe and moving therewith, whereby to apply electrostatic charges to said selected areas.

2. A method of electrostatic recording as described in claim 1 wherein:
   said electrically insulating film is a plastic film selected from the group consisting of acrylic material, polystyrene material, polytetrafluoroethylene material, and polyethyleneterephthalate material, and
   said liquid is one from the group consisting of water, ethanol, methanol, and mixtures thereof.

3. A method of electrostatic recording as described in claim 1 wherein:
   said probe is a relatively pointed member, and
   the step of applying relative motion between said probe and said opposite major surface of said film comprises applying electrostatic charges in a linear array on said opposite major surface.

4. A method of electrostatic recording as described in claim 1 wherein:
   said source of voltage is between about 20 and about 100 volts ac.

5. A method of electrostatic recording as described in claim 1 wherein:
   said source of voltage is between about 20 and 100 volts dc.

6. A method of electrostatic recording as described in claim 1 wherein:
   said probe comprises a patterned surface, and
   the step of applying relative motion between said probe and the opposite major surface and of said film comprises momentarily bringing said liquid on said patterned surface of said wetted probe into non-wetting contact with selected areas of said opposite major surface.

7. In a method of electrostatic recording on one surface of an electrically insulating film with a probe, the improvement comprising:
   biasing said probe with a voltage of between about 20 and about 100 volts with respect to an opposite surface of said film,
   wetting said probe with an electrically conductive liquid that is non-wetting on said film, and
   applying relative motion between said probe and said one surface of said film, said liquid adhering to said probe and moving therewith whereby to apply electrostatic charge patterns on said film.

8. In a method of electrostatic recording as described in claim 7 wherein:
   said probe has a patterned surface, and
   said patterned surface of said probe is brought into momentary contact with said one surface of said film, said liquid adhering only to said probe and moving therewith, whereby to apply an electrostatic charge pattern of said patterned surface to said film.

9. In a method of electrostic recording as described in claim 7 wherein:
   said electrostatic charge patterns are read-out nondestructively by moving said probe over said charge pattern slightly spaced from said one surface of said film, and
   amplifying the charges capacitively coupled to said probe.

10. In a method of electrostatic recording as described in claim 7 wherein:
    said wetted probe is moved over said charge patterns to read-out said charge patterns, and
    applying the charge patterns read-out.

11. In a method of electrostatic recording as described in claim 7 wherein:
    said electrostatic charge patterns are made visible with toner particles by applying toner particles from a grounded container to said one surface of said film.

12. In a method of electrostatic recording as described in claim 7 wherein:
    said electrostatic charge patterns are erased by moving a grounded wetted probe over said one surface of said film.

13. A method of electrostatic recording on an electrically insulating film comprising the steps of:
    wetting a probe with an electrically conductive liquid that is non-wetting on said film, disposing one surface of said film on electrical conductors which, in turn, are disposed on an insulating substrate, a charge pattern being on said electrical conductors, grounding said wetted probe, and moving said grounded wetted probe over the opposite surface of said film, whereby to reproduce on said opposite surface of said film a charge pattern of opposite polarity to said charge pattern on said conductors.

* * * * *

UNITED STATES PATENT OFFICE
CERTIFICATE OF CORRECTION

PATENT NO. : 3,872,480

DATED : March 18, 1975

INVENTOR(S) : Rudolf Succo Engelbrecht

It is certified that error appears in the above-identified patent and that said Letters Patent are hereby corrected as shown below:

Column 1, line 66 "shematic" should be --schematic--

Column 5, line 34 "(up to $10^{116}$ $^4$A/cm$^2$)" should read --(up to $10^{-4}$ A/cm$^2$)--

Column 6, line 7 after "and" insert --about--

Signed and sealed this 24th day of June 1975.

(SEAL)
Attest:

RUTH C. MASON
Attesting Officer

C. MARSHALL DANN
Commissioner of Patents
and Trademarks